(12) United States Patent
Cuellar et al.

(10) Patent No.: US 8,020,885 B2
(45) Date of Patent: *Sep. 20, 2011

(54) COUPLER LOCKOUT DEVICE

(75) Inventors: Maja A. Cuellar, West Allis, WI (US); D. Scott Kalous, Kenosha, WI (US)

(73) Assignee: Master Lock Company LLC, Oak Creek, WI (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/260,543

(22) Filed: Oct. 29, 2008

(65) Prior Publication Data
US 2009/0079163 A1    Mar. 26, 2009

Related U.S. Application Data (63) Continuation-in-part of application No. 11/375,851, filed on Mar. 14, 2006, now Pat. No. 7,469,919.

(60) Provisional application No. 60/983,286, filed on Oct. 29, 2007, provisional application No. 60/594,132, filed on Mar. 14, 2005.

(51) Int. Cl.
*B60D 1/60* (2006.01)

(52) U.S. Cl. .................. 280/507; 70/14; 70/232; 70/258

(58) Field of Classification Search .................. 280/507; 70/258, 14, 18, 19, 209, 232
See application file for complete search history.

(56) References Cited

U.S. PATENT DOCUMENTS

| | | |
|---|---|---|
| 1,543,397 A | 6/1925 | Schroeder |
| 3,307,857 A | 3/1967 | Robertson |
| 3,492,023 A | 1/1970 | Thompson |
| 3,780,546 A | 12/1973 | Longenecker |
| 3,810,664 A | 5/1974 | Nunnink, Jr. et al. |
| 3,820,283 A | 6/1974 | Acerra et al. |
| 3,977,221 A | 8/1976 | Foote |

(Continued)

FOREIGN PATENT DOCUMENTS

WO    03078183    9/2003

OTHER PUBLICATIONS

International Search Report and Written Opinion from International Application No. PCT/US06/09344, dated Sep. 21, 2007.

(Continued)

*Primary Examiner* — Paul N Dickson
*Assistant Examiner* — Wesley Potter
(74) *Attorney, Agent, or Firm* — Calfee, Halter & Griswold LLP (57) ABSTRACT

An assembly for restricting access to a coupler includes a body having a coupler engagement portion for engagement with a first surface of a coupler, a coupler engagement member laterally movable within a laterally extending slot in the body, with the coupler engagement member extending perpendicularly from the slot for engagement with a second surface of the coupler opposite the first surface. The assembly further includes a securing mechanism for selectively securing the coupler engagement member relative to the body against lateral movement away from the coupler engagement portion. When at least a portion of the coupler is received between the coupler engagement portion and the coupler engagement member and the coupler engagement member is secured in a coupler lockout position, at least one of the coupler engagement portion and the coupler engagement member prevents withdrawal of the coupler from the assembly.

19 Claims, 11 Drawing Sheets

U.S. PATENT DOCUMENTS

| | | |
|---|---|---|
| 4,032,171 A | 6/1977 | Allen et al. |
| 5,087,064 A | 2/1992 | Guhlin |
| 5,094,423 A | 3/1992 | Almquist |
| 5,181,405 A | 1/1993 | Wheeler |
| 5,255,545 A | 10/1993 | Wheeler |
| 5,743,549 A | 4/1998 | Jackson |
| 6,393,874 B1 | 5/2002 | Zapushek et al. |
| 6,412,313 B1 | 7/2002 | Bernstrom |
| 6,722,686 B2 | 4/2004 | Koy |
| 7,040,646 B2 | 5/2006 | Pare |
| D541,135 S | 4/2007 | Kalous et al. |

OTHER PUBLICATIONS

Preliminary Report on Patentability from International Application No. PCT/US2006/009344, dated Oct. 16, 2007.

Office Action dated May 1, 2008 for U.S. Appl. No. 11/375,851.

COUPLER LOCKOUT DEVICE

CROSS-REFERENCE TO RELATED APPLICATIONS

This non-provisional application claims the benefit of U.S. Provisional Patent App. No. 60/983,286, entitled COUPLER LOCKOUT DEVICE and filed on Oct. 29, 2007, the entire disclosure of which is hereby incorporated by reference, to the extent that it is not conflicting with the present application. This application is also a continuation-in-part of U.S. patent application Ser. No. 11/375,851, entitled COUPLER LOCK and filed on Mar. 14, 2006, which claims the benefit of U.S. Provisional Patent App. No. 60/594,132, entitled TRAILER COUPLER LOCK and filed on Mar. 14, 2005, the entire disclosures of both of which are hereby incorporated by reference, to the extent that they are not conflicting with the present application.

BACKGROUND

Heavy equipment, trailers, vehicles, and other such items often utilize a coupler connection, for example, to connect to a fluid system, or to connect to a truck or other towing vehicle for transportation of the item. While the size and weight of such items make them less prone to theft, the inclusion of a coupler assembled with or affixed to the item poses the risk of theft by individuals with a truck having a trailer hitch configured to connect with the coupler.

SUMMARY

This invention is directed to devices and methods for securing a coupler against unauthorized access or use. According to an inventive aspect of the present application, features of the exemplary devices and methods described herein enable a coupler lock to secure a variety of couplers of varying designs and sizes.

Accordingly, in one embodiment of the present application, an assembly for restricting access to a coupler includes a body having a coupler engagement portion for engagement with a first surface of a coupler, a coupler engagement member laterally movable within a laterally extending slot in the body, with the coupler engagement member extending perpendicularly from the slot for engagement with a second surface of the coupler opposite the first surface. The assembly further includes a securing mechanism for selectively securing the coupler engagement member relative to the body against lateral movement away from the coupler engagement portion. When at least a portion of the coupler is received between the coupler engagement portion and the coupler engagement member and the coupler engagement member is secured in a coupler lockout position, at least one of the coupler engagement portion and the coupler engagement member prevents withdrawal of the coupler from the assembly.

BRIEF DESCRIPTION OF THE DRAWINGS

Features and advantages of the invention will become apparent from the following detailed description made with reference to the drawings, wherein.

DETAILED DESCRIPTION

This Detailed Description merely describes embodiments of the invention and is not intended to limit the scope of the claims in any way. Indeed, the invention as claimed is broader than and unlimited by the preferred embodiments, and the terms used in the claims have their full ordinary meaning.

The present application contemplates providing a lockout device configured to block access to a coupler. While the exemplary embodiments described herein involve couplers configured to connect to or couple with a corresponding trailer hitch, the inventive features described herein may also be used to block access to other types of couplers, including, for example, fluid system connections, access ports, or other such couplers for which unrestricted access to the coupler may present a risk of theft, tampering, or hazardous conditions. Examples of conventional trailer coupling connections include ball mount couplers, gooseneck couplers, and coupling pins (e.g., king pin couplers) for coupling with "fifth wheel" trailer hitches. According to an inventive aspect of the present application, a lockout device may be configured to be lockingly secured over, around, or into a hitch-engaging (or other type of mating) portion of the coupler, to prevent coupling engagement of the coupler with a corresponding trailer hitch (or other such connection). When an authorized user desires to connect the coupler to a trailer hitch (for example, to transport the item to which the coupler is affixed), the user unlocks the lockout device, moves the lockout device to an open or coupler receiving position, and removes the lockout device from the coupler.

Because couplers (and corresponding trailer hitches) vary widely in size, shape, and type of coupling engagement, a coupler lockout device that provides a single lockout position or locking condition may be limited to use with a single type and size of coupler. A coupler lockout device may be configured to provide a plurality of lockout positions or locking conditions to accommodate multiple sizes and types of couplers.

Figure 1:
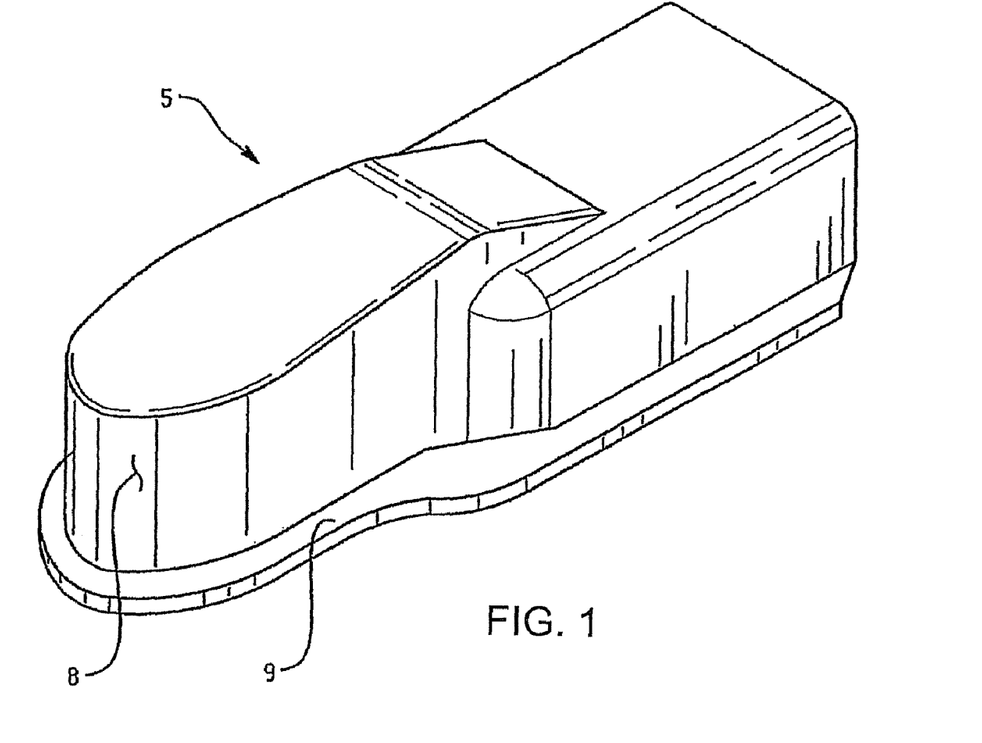
FIG. 1 is a perspective view of a coupler.
Figure 2:
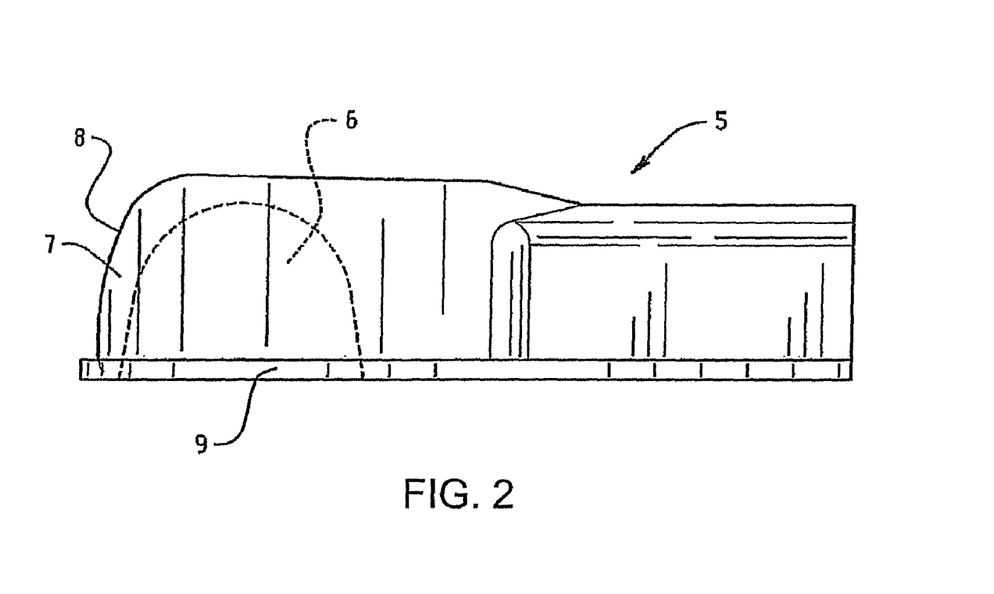
FIG. 2 is a side view of the coupler of FIG. 1.

Coupler locks are used to restrict access to trailer couplers and other such devices designed to engage a ball hitch or other such connection. As illustrated in FIGS. 1 and 2, a ball mount coupler 5 typically includes a ball cavity 6 (seen in phantom line in FIG. 2) that accommodates a ball hitch. The ball cavity 6 is typically positioned near one end of the coupler 5 leaving a shell 7 between the ball cavity 6 and an exterior surface 8 of the coupler 5. Couplers also may include a flange 9, which runs along an outer perimeter of the coupler 5. The coupler 5 illustrated in FIGS. 1 and 2 is exemplary only, as couplers are manufactured in a wide variety of sizes and designs.

Coupler locks include mechanisms to prohibit ball hitches from entering a ball cavity of a coupler when the coupler lock is attached to the coupler. In addition, coupler locks include mechanisms for securing the coupler lock to the coupler to prevent unauthorized persons from removing the coupler lock and accessing the ball cavity. Such mechanisms allow only an authorized person to remove the coupler lock from the coupler. To accommodate couplers of various sizes and designs, the coupler lock of the present invention is designed with components that move relative to other components of the coupler lock. Relative movement of such components allow the coupler lock to be adjusted to accommodate such different sized and designed couplers.

Figure 3:
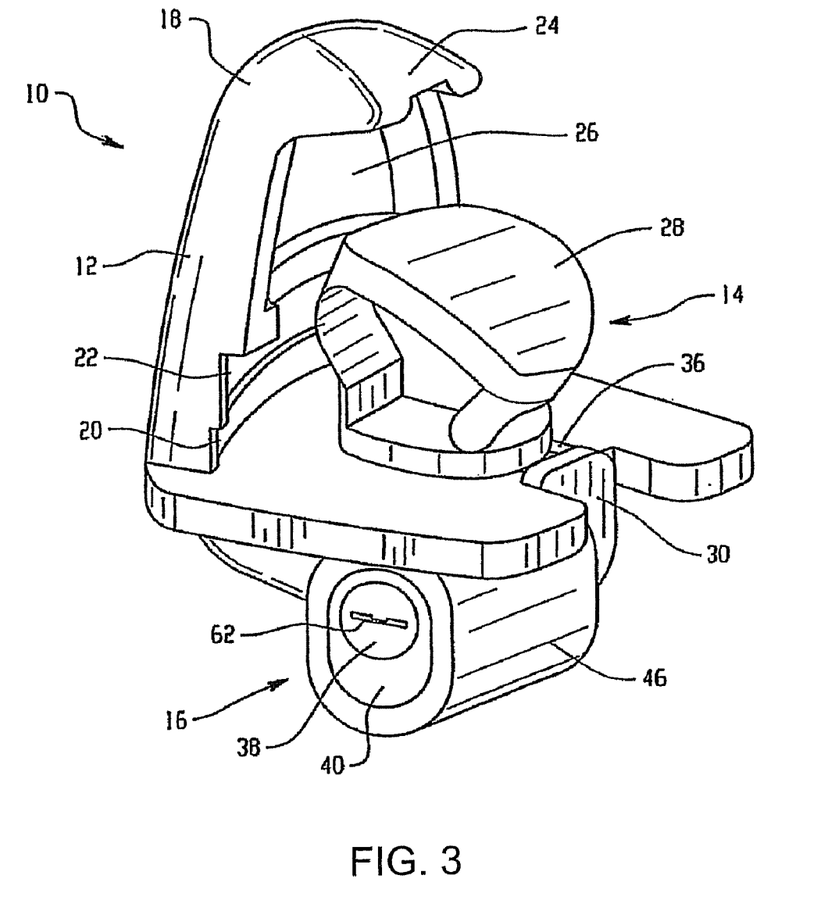
FIG. 3 is perspective view of a coupler lock constructed in accordance with one embodiment of this invention.

Referring to FIG. 3, a perspective view of an exemplary adjustable coupler lock 10 is shown. The coupler lock 10 includes a main body 12, a ball cavity engagement mechanism or coupler engagement member 14, and a locking or securing mechanism 16. The ball cavity engagement mechanism 14 is movably coupled to the body 12 and can be arranged to allow the coupler lock 10 to engage and secure a variety of couplers, which may range in size and design. The locking mechanism 16 can be selectively arranged to allow the ball cavity engagement mechanism 14 to move relative to the body 12 or can be selectively arranged to fix the location of the ball cavity engagement mechanism 14 relative to the body 12. When the ball cavity engagement mechanism 14 is free to move relative to the body 12, the coupler lock 10 can be adjusted to attach to a coupler. Once the coupler lock 10 is attached to a coupler, the ball cavity engagement mechanism 14 can be fixed relative to the body 12 to secure the coupler lock 10 to the coupler.

The body 12 includes an external coupler engagement portion 18 and first and second grooves 20 and 22. The external coupler engagement portion 18 extends from the body 12 and forms a hook or L-shaped engagement protrusion 24. As will be described, the external coupler engagement portion 18 of the body 12 can be arranged to engage an external or outer surface of a coupler when the coupler lock 10 is attached to or secured to a coupler. The first and second grooves 20 and 22 are located on a wall 26 of the body 12. In the illustrated embodiment, the wall 26 is generally vertical and located along an inner surface of the body 12. As shown in FIGS. 1 and 2, couplers 5 are often designed with flanges 9 along an outer perimeter. The first and second grooves 20 and 22 are arranged to accommodate a variety of flanges of different couplers when the coupler lock 10 is attached to or secured to a coupler.

Figure 4:
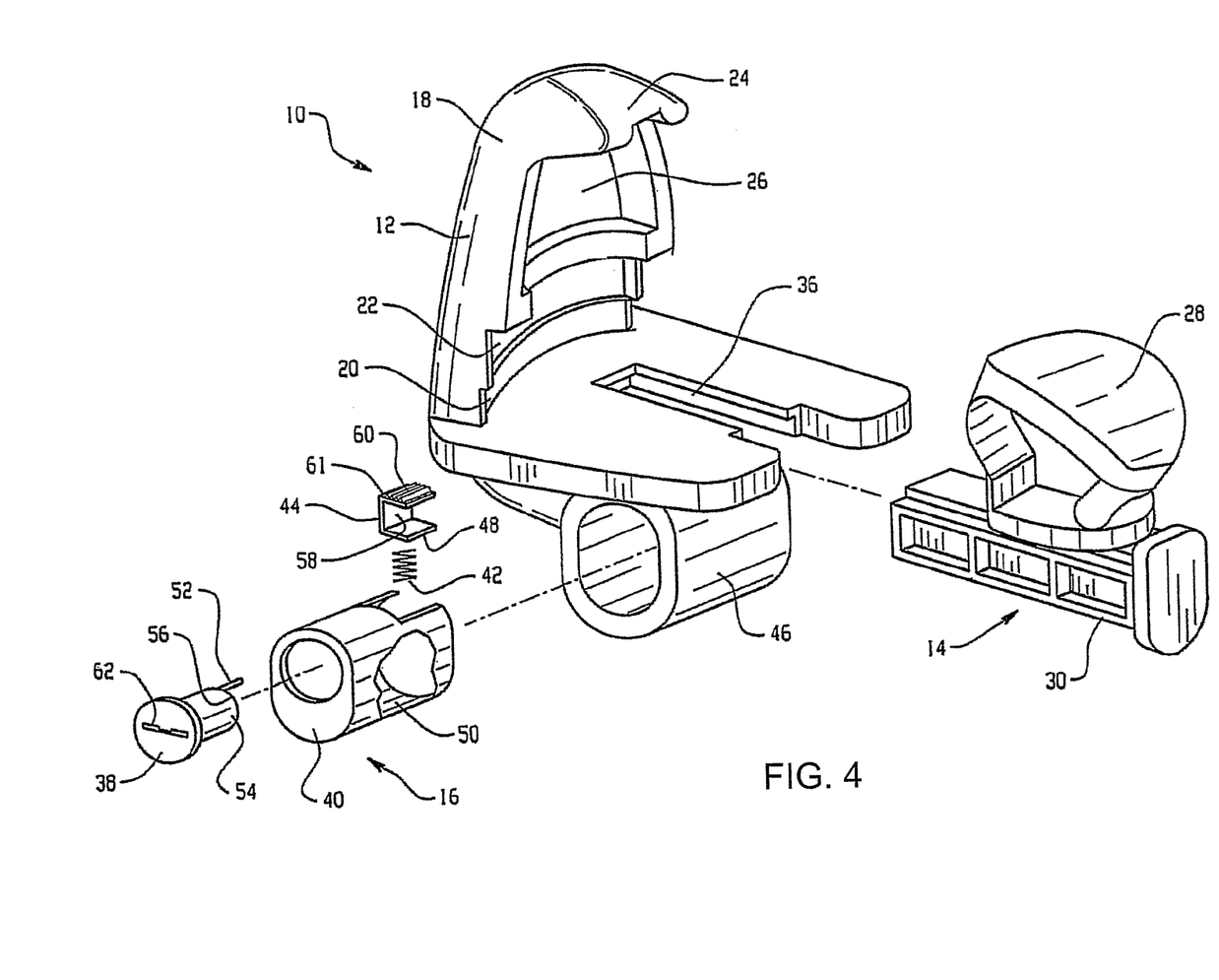
FIG. 4 is an exploded view of the coupler lock of FIG. 3.
Figure 4A:
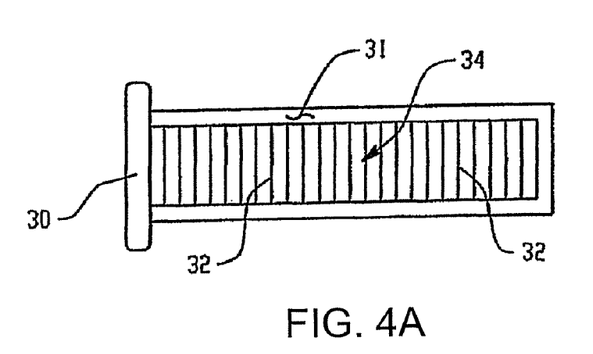
FIG. 4A is a bottom view of the slide of the coupler lock of FIG. 3.

Referring to FIG. 4, the ball cavity engagement mechanism 14 includes a ball-like protrusion 28 rigidly attached to a square slide 30. As seen in FIG. 4A, a bottom surface 31 of the square slide 30 includes a series of teeth 32 arranged perpendicularly to the length of the slide 30. These teeth 32 form a rack 34 that can be engaged to limit the movement of the slide 30. The body 12 includes a slot 36 arranged to accommodate the slide 30, with the ball cavity engagement mechanism extending vertically or perpendicularly from the slot 36. The slide 30 fits into the slot 36 and allows the ball cavity engagement mechanism 14 to move relative to the body 12. The ball cavity engagement mechanism 14 is arranged such that when the ball cavity engagement mechanism 14 is moved, the distance between the ball-like protrusion 28 and the wall 26 of the body 12 changes.

With reference to FIGS. 3 and 4, as the ball cavity engagement mechanism 14 moves to the right (or away from the coupler engagement portion 18), the distance between the ball-like protrusion 28 and the wall 26 of the body 12 increases. As the ball cavity engagement mechanism 14 moves to the left, the distance between the ball-like protrusion 28 and the wall 26 of the body 12 decreases. Optionally, the slide 30 can include a stop member (not shown) to prevent the slide 30 from fully exiting the slot 36 as the slide 30 is moved to the right. The slide 30, as shown, has a square cross-section; however, the cross-section of a slide and the configuration of a slide, slot, and ball-like protrusion is not limited to that shown. Any cross-section and configuration that allows a ball-like protrusion or other engagement member to move in at least two directions relative to a body is included in this disclosure.

Generally, the coupler lock 10 is attached to a coupler by clamping a portion of the coupler between the ball-like protrusion 28 and a portion of the body 12. The portion of the coupler that is clamped in generally the shell 7 of the coupler 5, as shown in FIG. 2. As will be subsequently discussed in detail, to attach and secure a coupler lock 10 to a coupler the ball-like protrusion 28 is placed within a ball cavity of a coupler. The ball cavity engagement mechanism 14 is then moved towards the body 12 to decrease the distance between the ball-like protrusion 28 and the wall 26 of the body 12. The ball cavity engagement mechanism 14 is moved in this direction until a portion of the coupler is clamped between the ball-like protrusion 28 and the body 12. The coupler lock 10 is then secured to the coupler by arranging the locking mechanism 16 to fix the location of the ball cavity engagement mechanism 14 relative to the body 12. Once the coupler lock 10 is in this locked or secured configuration, the locking mechanism 16 must be unlocked to allow the ball cavity engagement mechanism 14 to be moved away from the wall 26 of the body 12 so that the coupler lock 10 can be removed from the coupler.

As best seen in FIG. 4, the locking mechanism 16 includes a lock cylinder 38, a sleeve 40, a spring 42, and a C-shaped engagement member 44. The locking mechanism 16 shown is for exemplary purposes only and other locking mechanism designs can be utilized in the practice of this invention. The locking mechanism 16 is assembled and located in a cylindrical housing 46, which is attached to the bottom of the body 12. The housing 46 is located below the slot 36 in the body 12. An opening (not shown) on the topside of the housing 46 provides the locking mechanism 16 with access to the slide 30 as the ball cavity engagement mechanism 14 moves along the slot 36. This access allows the locking mechanism 16 to interact with the rack feature 34 of the slide 30 to either fix the position of the ball cavity engagement mechanism 14 with respect to the body 12, which places the coupler lock 10 into a locked state; or allow the ball cavity engagement mechanism 14 to move freely with respect to the body 12, which places the coupler lock 10 into an unlocked state. Optionally, the locking mechanism 16 can additionally (or alternative to the locked state) be arranged to limit the movement of the ball cavity engagement mechanism 14 to one direction with respect to the body 12, which places the coupler lock 10 into an adjustment state. The adjustment state, as will be further described, can assist the user in attaching and securing the coupler lock 10 to a coupler When the locking mechanism 14 is assembled, the lock cylinder 38, C-shaped engagement member 44, and spring 42 are at least partially located within the sleeve 40. The spring 42 is located between a bottom surface 48 of the C-shaped engagement member 44 and an internal surface 50 of the sleeve 40. The spring 42 is configured to bias the C-shaped engagement member 44 upwards (with respect to FIG. 4) toward the slide 30 of the ball cavity engagement mechanism 14. The lock cylinder 38 includes a tab 52 extending from a first end 54 of the lock cylinder 38. The tab 52 is offset from the longitudinal center of the lock cylinder 38 and preferable located near the outer edge 56 of the lock cylinder 38 (as seen in FIG. 4). When the locking mechanism 16 is assembled, the tab 52 of the lock cylinder 38 is located within the C-shaped engagement member 44 and comes into contact with an internal surface 58 of the C-shaped engagement member 44. The interaction of the tab 52 and the internal surface 58 of the C-shaped engagement member 44 determines whether the coupler lock 10 is in a locked state, an unlocked state, or an adjustment state.

The C-shaped engagement member 44 includes a series of ridges 60 that are designed to interact with the rack 34 on the underside of the square slide 30. The ridges 60 are located on a top surface 61 of the C-shaped engagement member 44 and can access the rack 34 through the opening in the housing 46. The lock cylinder 38 includes a key slot 62 to accommodate a key. When a proper key is inserted into the key slot 62, the lock cylinder 38 can be turned or rotated, thus changing the orientation of the lock cylinder 38. As the orientation of the lock cylinder 38 changes, the position of the tab 52 relative to the C-shaped engagement member 44 changes. As the position of the tab 52 changes, the C-shaped engagement member 44 changes position relative to the square slide 30, which changes the nature of the interaction between the ridges 60 and the rack 34.

When the lock cylinder 38 is oriented such that the tab 52 is at the highest point, or the 12 o'clock position (as seen in FIG. 4) the tab 52 forces the C-shaped engagement member 44 to its highest point and places the coupler lock 10 in the locked state. In this locked state the ridge features 60 of the C-shaped engagement member 44 are fully engaged with the teeth features 32 on the rack 34 on the underside of the square slide 30. The C-shaped engagement feature 44 is rigidly held in this position by the tab 52. In this configuration, the ridges 60 on the C-shaped engagement member 44 and the teeth 32 on the rack 34 interact to lock the slide 30. This arrangement stops any substantial movement of the ball cavity engagement mechanism 14 relative to the body 12.

When the lock cylinder 38 is rotated 180 degrees from the locked state, to the 6 o'clock position (with respect to FIG. 4), the tab 52 forces the C-shaped engagement mechanism 44 to its lowest point and the coupler lock 10 is placed in the unlocked state. In this unlocked state, the ridges 60 are no longer engaged with the teeth 32 of the rack 34 and the ball cavity engagement mechanism 14 is free to slide in either direction within the slot 36.

To place the coupler lock 10 into an adjustment state, the lock cylinder 38 is rotated 90 degrees counter-clockwise of the locked position or 90 degrees clockwise of the unlocked position, to the 9 o'clock position (with respect to FIG. 4). In this adjustment state, the position of the C-shaped engagement member 44 is controlled by the spring 42 positioned beneath the C-shaped engagement member 44. The spring 42 biases the C-shaped engagement member 44 such that the ridge features 60 are engaged with the teeth 32 of the rack 34. However, the position of the C-shaped engagement member 44 is not rigidly set. The spring 42 allows the C-shaped engagement member 44 to move downward when movement of the rack 34 causes the teeth 32 to apply a downward force on the C-shaped engagement member 44 that is larger than the upward force the spring 42 applies to the C-shaped engagement member 44. In this arrangement, the ridge features 60 and the teeth 32 exhibit ratcheting behavior, with the ridge features 60 serving as a pawl for the teeth 32. This ratcheting behavior allows the slide 30, and thus the ball-like protrusion 28, to move incrementally towards the wall 26 of the body 12, but prohibits the slide 30 from moving in the opposite direction away from the wall 26 of the body 12.

One method for attaching and securing the coupler lock 10 to a coupler is as follows. The lock cylinder 38 of the coupler lock 10 is placed in the unlocked state by using a proper key. The ball-like protrusion 28 is moved away from the wall 26 of the body 12. The ball-like protrusion 28 is placed within the ball cavity of the coupler. The ball-like protrusion 28 is moved towards the wall 26 of the body 12 until a portion of the coupler is positioned and clamped between the ball-like protrusion 28 and a portion of the body 12. The lock cylinder 38 is placed in the locked state using the proper key to fix the position of the ball-like protrusion 28 relative to the body 12. This method captures a portion of the coupler between the ball-like protrusion 28 and a portion of the body 12 such that the ball cavity is inaccessible to a ball hitch and the coupler lock 10 cannot be removed from the coupler without first placing the lock cylinder 38 in an unlocked state using the proper key.

Optionally, the lock cylinder 38 can be placed in the adjustable state after the ball-like protrusion 28 is placed within the ball cavity. In this arrangement, the ball-like protrusion 28 is allowed to move incrementally and only in one direction, i.e., towards the wall 26 of the body 12. Under these conditions, a user does not have to maintain pressure on the coupler lock 10 while turning the lock cylinder 38 to the locked state. The user can apply pressure to clamp a portion of the coupler between the ball-like protrusion 28 and a portion of the body 12 and that pressure is maintained by the ratcheting system provided by the ridges 60 of the C-shaped engagement member 44 and the teeth 32 of the rack 34 when the user releases pressure to place the coupler lock 10 in the locked position.

Figure 5:
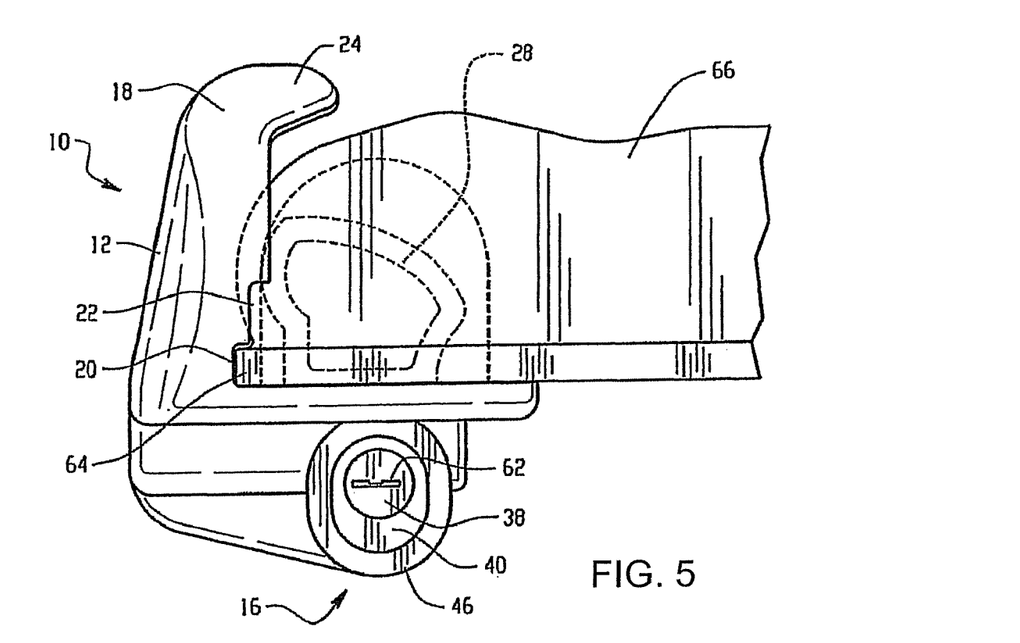
FIG. 5 is side view of the coupler lock of FIG. 3 secured to a coupler with a flange.

A flange of a coupler can also be utilized to securely attach a coupler lock 10 to a coupler. Referring to FIG. 5, a flange 64 of a coupler 66 is located within the first groove 20 of the body 12. When the coupler lock 10 is secured to the coupler 66, having the flange 64 positioned within a groove 20 will further resist any attempt to remove the coupler lock 10 from the coupler 66 through unauthorized means. FIG. 5 illustrates the first groove 20 in use; however, the second groove 22 can also be used in a similar manner for flanges that cannot fit into the first groove 20. Although two grooves 20 and 22 are shown, any number of grooves can be included in a body to accommodate a variety of flange sizes and designs. Optionally, the coupler engagement portion 18 of the body 12 can be placed in contact with the coupler 66.

Figure 6:
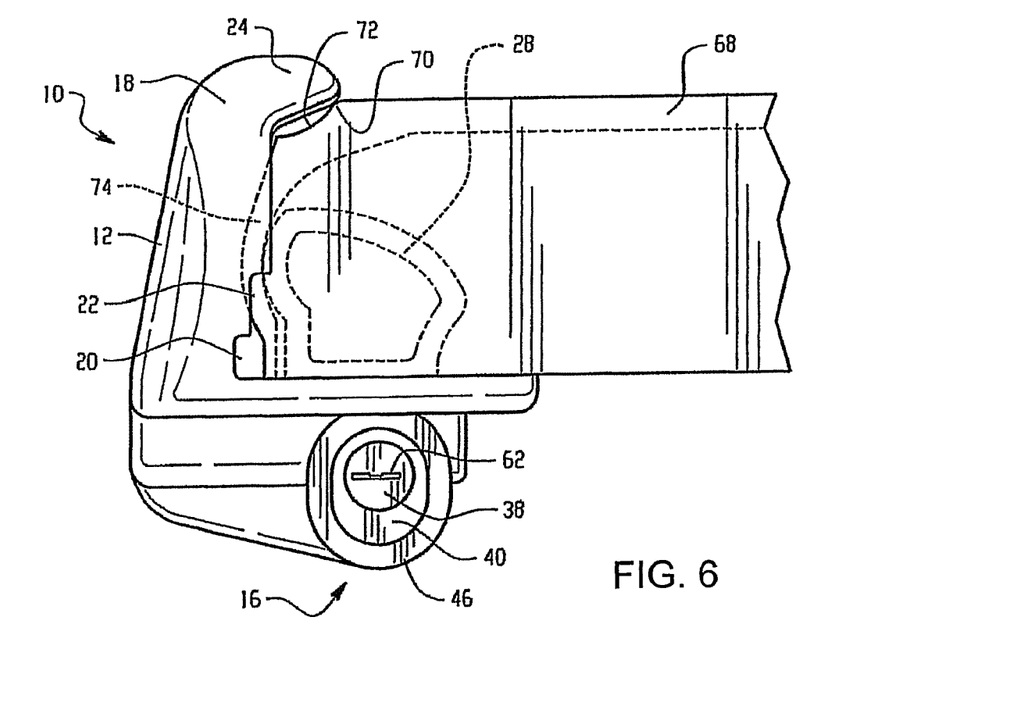
FIG. 6 is a side view of the coupler lock of FIG. 3 secured to a coupler without a flange.

Not all couplers are designed with flanges. Referring to FIG. 6, a coupler lock 10 is shown secured to a flangeless coupler 68. The coupler engagement portion 18 of the body 12 is shown in contact with an external surface 70 of the coupler 68. The coupler engagement portion 18 can be used to further secure the coupler lock 10 to the flangeless coupler 68. The coupler engagement portion 18 may be configured to engage a top portion 72 of the coupler 68 to resist upward movement of the coupler 68. In addition, the coupler lock 10 can be arranged such that a portion 74 of the coupler 68 is clamped between the ball-like protrusion 28 and the coupler engagement portion 18 of the body 12.

Referring to FIGS. 7 through 11, another embodiment of an adjustable coupler lock 100 is illustrated. The ball cavity engagement mechanism 14, the movement of the ball cavity engagement mechanism 14 relative to the body 102, the locking mechanism 16, and the first and second grooves 20 and 22 are generally the same as described in FIGS. 3 through 6. The shape of the ball-like protrusion 103 is generally more spherical than the ball-like protrusion 28 shown in FIGS. 3 through 6.

Figure 8:
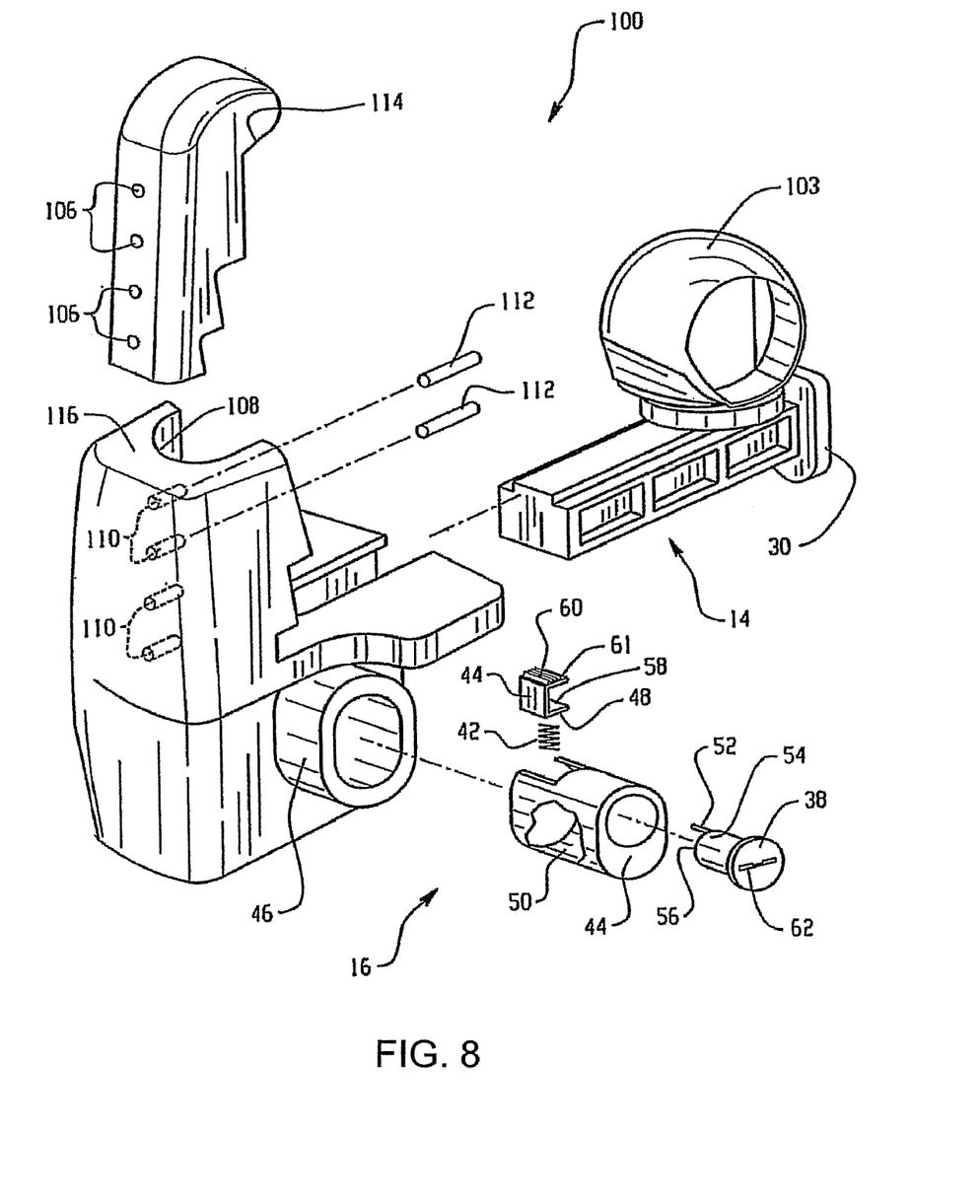
FIG. 8 is an exploded view of the coupler lock of FIG. 7.

In this embodiment, the coupler engagement portion is no longer an integral portion of the body 102. The general function performed by the coupler engagement portion, to engage an outer surface of the coupler, is performed by a separate component 104 whose position can be adjusted relative to the body 102. As best shown in FIG. 8, an L-shaped protrusion member 104 can be adjustably coupled to the body 102. The L-shaped protrusion member 104 can be coupled and secured to the body 102 in a number of positions. The L-shaped protrusion member 104 includes a series of apertures 106. The wall 108 of the body 102 includes a series of tapped holes 110. Screws 112 or other such fasteners can be inserted through the apertures 106 in the L-shaped protrusion member 104 and secured into the tapped holes 110 in the body 102. This mechanism can be used to determine and adjust the position of the L-shaped protrusion member 104 relative to the body 102. This positioning determines how much a coupler engagement portion 114 of the L-shaped protrusion member 104 extends above the top 116 of the body 102.

The position of the L-shaped protrusion member 104 relative to the body 102 can be adjusted to accommodate different designs and sizes of couplers. The L-shaped protrusion member 104 can be positioned higher, relative to the body 102, for couplers with higher profiles. Conversely, the L-shaped protrusion member 104 can be positioned lower, relative to the body 102, for couplers with lower profiles.

Figure 9:
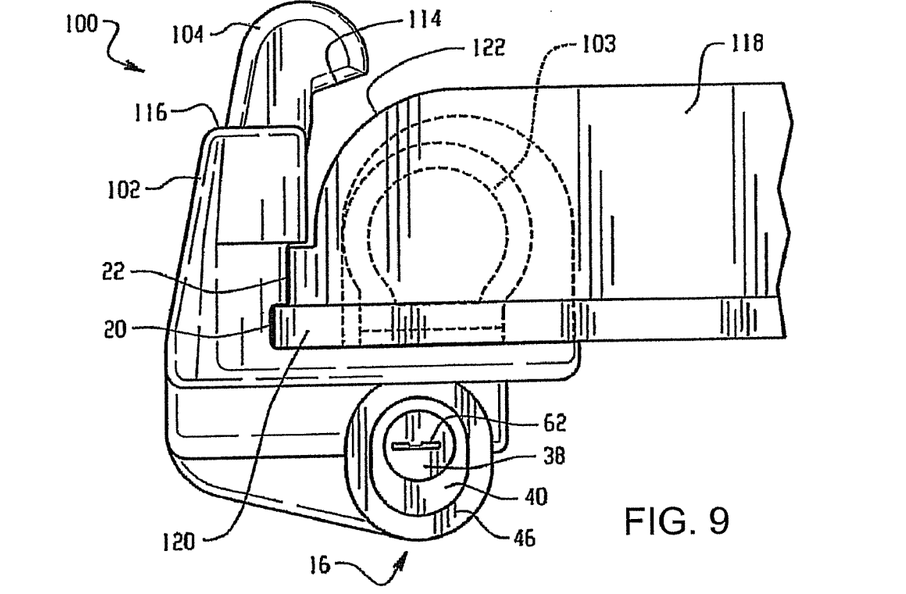
FIG. 9 is a side view of the coupler lock of FIG. 7 secured to a coupler with a flange.

As shown in FIG. 9, a coupler lock 100 is shown secured to a coupler 118 with a flange 120. Similarly to FIG. 5, the flange 120 is positioned in the first groove 20 to further resist any attempt to remove the coupler lock 100 from the coupler 118 through unauthorized means. The L-shaped protrusion member 104 may be optionally positioned such that the coupler engagement portion 114 engages an external surface 122 of the coupler 118. This engagement can offer additional resistance to removal of the coupler lock 100 from the coupler 118 through unauthorized means.

Figure 10:
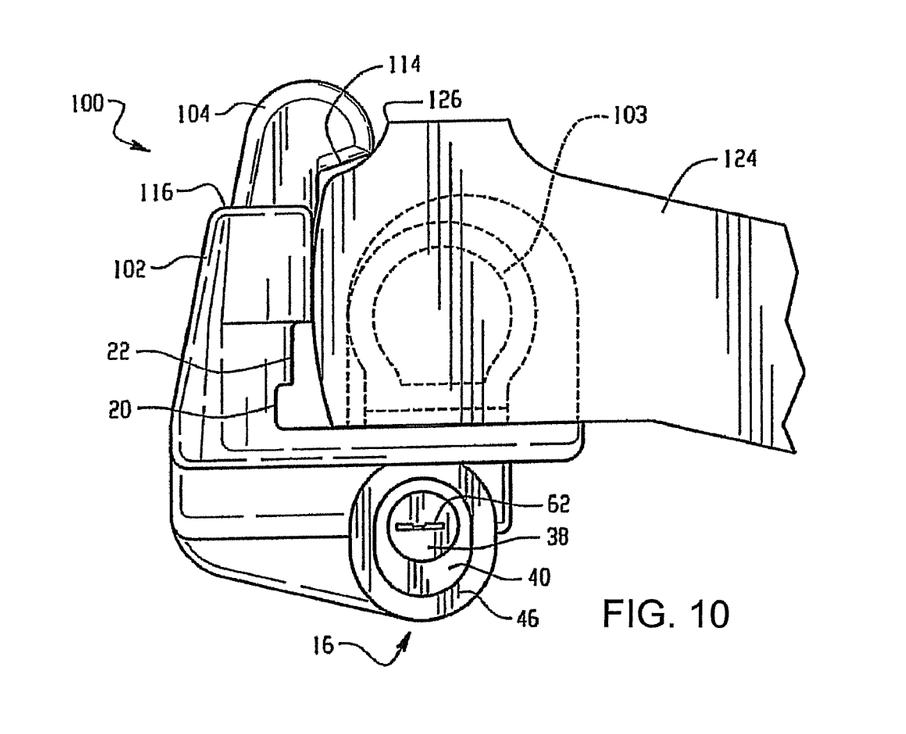
FIG. 10 is a side view of a coupler lock of FIG. 7 secured to a coupler without a flange.
Figure 11:
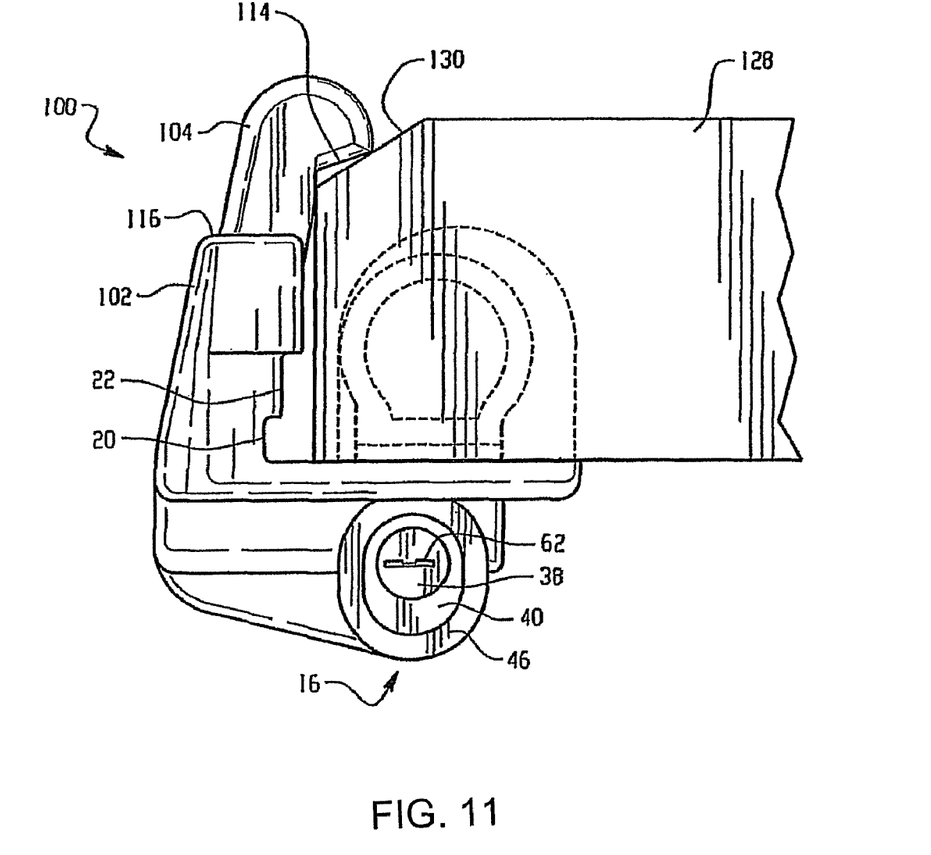
FIG. 11 is a side view of a coupler lock of FIG. 7 secured to another coupler without a flange.

The flexibility in positioning the L-shaped protrusion member 104 is shown in FIGS. 10 and 11. In FIG. 10, the coupler lock 100 is secured to a coupler 124 with a relatively low profile and an indent in the outer surface 126. This allows the coupler engagement portion 114 of the L-shaped protrusion member 104 to engage an outer surface 126 of the coupler 124 while a relatively small portion of the L-shaped protrusion member 104 extends above the top 116 of the body 102. In FIG. 11, the coupler lock 100 is secured to a coupler 128 with a relatively high profile. Under these circumstances, the coupler engagement portion 114 of the L-shaped protrusion member 104 can engage an outer surface 130 of the coupler 128 when the L-shaped protrusion member 104 is positioned such that a relatively large portion of the L-shaped protrusion member 104 extends above the top 116 of the body 102. In both FIGS. 10 and 11, the L-shaped protrusion member 104 is secured to the body 102 by at lest one fastener 112 passing through at least one aperture 106 in the L-shaped protrusion member 104 and being secured in at least one tapped hole 110 in the wall 108 of the body 102.

Figure 7:
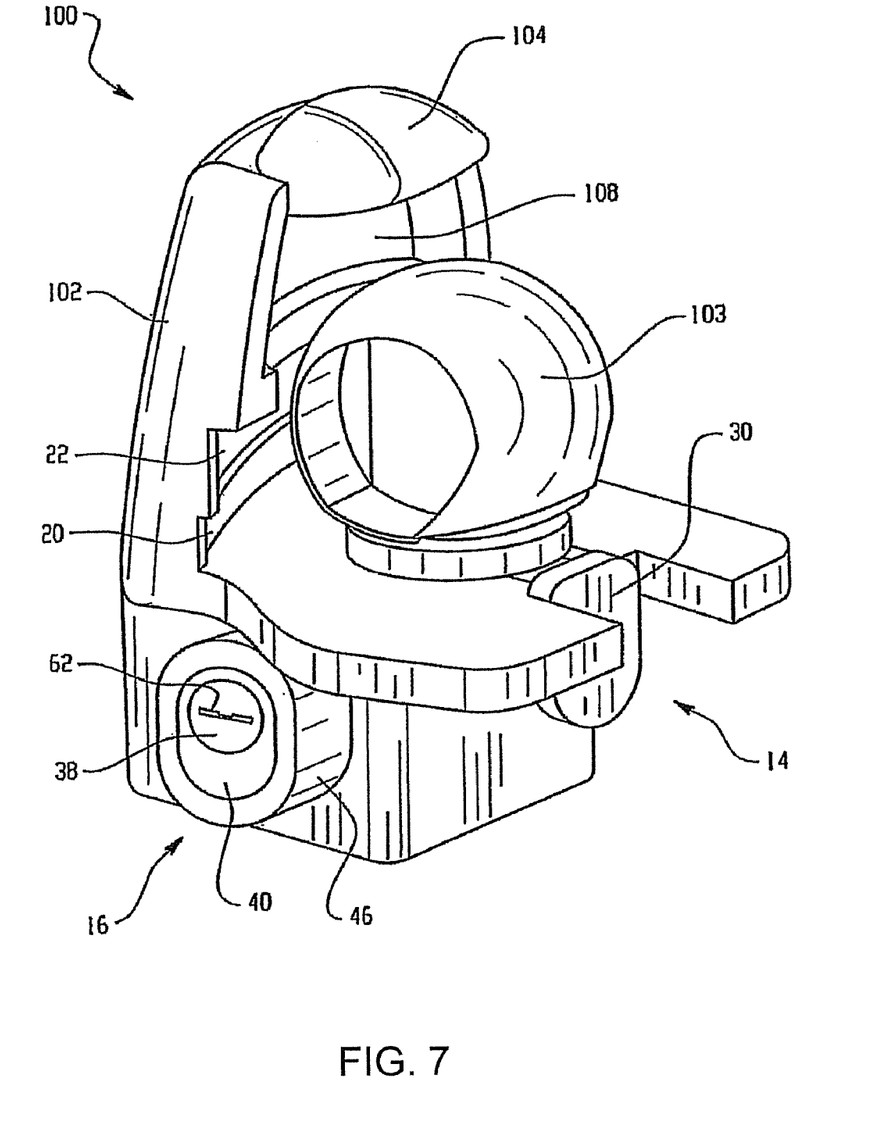
FIG. 7 is a perspective view of a coupler lock constructed in accordance with another embodiment of this invention.

In the coupler lock 100 as shown in FIGS. 7 though 11, the L-shaped protrusion member 104 must be positioned and attached to the body 102 with fasteners 112 before the coupler lock 100 is attached to a coupler. However, this disclosure is not limited to the arrangement shown. Configurations in which the position of an L-shaped protrusion member relative to a body can be adjusted after the coupler lock engages with a coupler are included in this disclosure. One such configuration is similar to that which allows for the ball cavity engagement mechanism 14 to be positioned relative to the body 12 and 102. A locking mechanism can be utilized to engage with an L-shaped protrusion member such that the position of the L-shaped protrusion member is adjustable until the locking mechanism is placed in a locked state. This locking mechanism can include an unlocked state and an adjustment state (in addition to or instead of the locked state) similar to that described herein.

The disclosure shows two different exemplary shapes for the ball-like protrusion 28 and 103. In FIGS. 7 through 11, the ball-like protrusion is generally spherical and in FIGS. 3 through 6, the ball-like protrusion includes generally flat surfaces. This disclosure is not limited to the protrusions shown or protrusions that are generally ball-like. Any protrusion that allows at least a portion of a coupler to be clamped between the protrusion and a portion of the body or other protrusion members is included in this disclosure.

In some applications, a coupler for connecting with a trailer hitch may include a cavity that is shaped or sized such that in cannot readily accommodate a protrusion 28 of a ball cavity engagement mechanism 14 (FIG. 4). In other applications, a coupler provided on a trailer or other item may not include a cavity at all, and may rely on some other coupling engagement. One example of such a coupler is a coupling pin or king pin coupler, which includes a pin having a flanged end configured to be received in a jawed portion of a corresponding trailer hitch.

Accordingly, in one inventive aspect of the present application, a lockout device may be configured to engage only external surfaces of a coupler, such that couplers having different types of internal cavities and couplers without internal cavities may be locked out to prevent unauthorized use of the coupler. In one embodiment, a lockout device includes a body member or fixed bracket configured to engage a first lateral external side surface of a coupler when the coupler is axially received within the lockout device. The exemplary lockout device further includes an adjustable coupler engaging member or adjustable bracket laterally movable with respect to the fixed bracket and lockable in a lockout position to capture an axial end portion of the coupler. One or both of the fixed bracket and adjustable bracket may include laterally extending coupler retaining portions to restrict lateral movement of the coupler with respect to the lockout device, and or to prevent axial withdrawal of the coupler from the lockout device when in the lockout position. The adjustable bracket is lockable in multiple incremental lateral positions for securing couplers of different sizes and/or shapes.

FIGS. 12-15 illustrate various views of an exemplary lockout device 200 for securing with a coupler to prevent coupling engagement of the coupler with a corresponding trailer hitch. The lockout device 200 includes a body member or fixed bracket 210 having a base portion 211 sized to at least partially cover (and block access to) an end face of a coupler (e.g., the coupler C of FIG. 15) when the lockout device 200 is secured to the coupler. A laterally extending or flanged retaining portion 212 is axially spaced from the base portion 211 to receive a laterally extending, enlarged, or flanged end portion of a coupler therebetween. Support brackets 213 may (but need not) be affixed (e.g., by welding, riveting, or any other suitable means) to the fixed bracket 210 to span the base portion 211 and the retaining portion 212, for example, to provide additional strength and durability or additional coverage of the secured coupler. One or more axially extending cutouts 214 may be provided to accommodate various flanges, tabs, fasteners, or other such projections that may extend laterally from the end portion of the secured coupler. Further, one or more laterally extending cutouts or openings 219 may be provided to accommodate the portion of the coupler extending axially outward from the lockout device 200, while permitting the retaining portion 212 to axially align with (and block) the enlarged end portion of the coupler.

Figure 12:
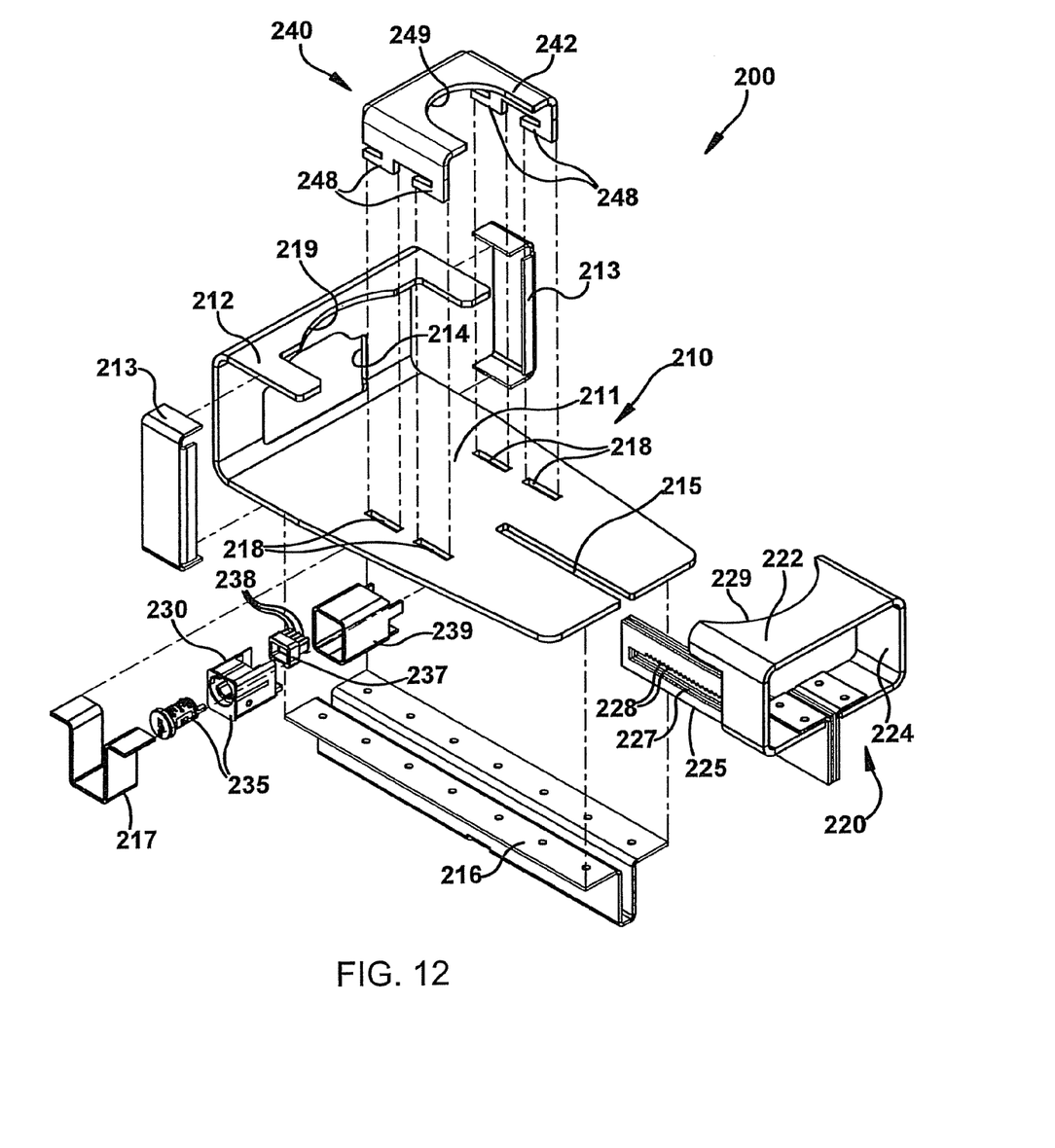
FIG. 12 illustrates an exploded perspective view of another coupler lockout device.
Figure 13:
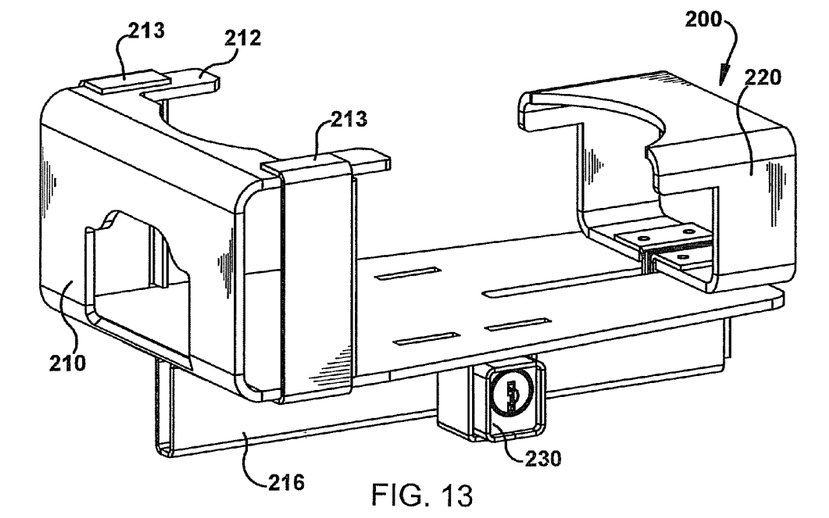
FIG. 13 illustrates a side perspective view of the coupler lockout device of FIG. 12 in a coupler receiving position.
Figure 14:
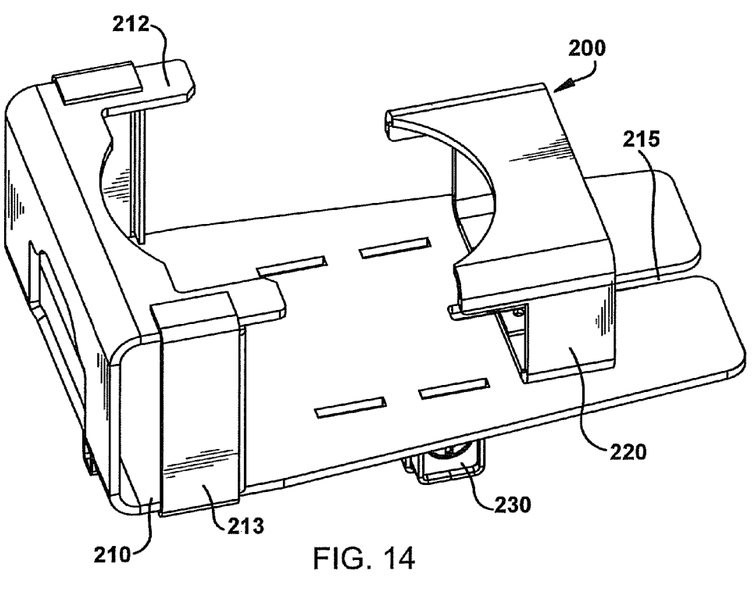
FIG. 14 illustrates a side perspective view of the coupler lockout device of FIG. 12 in a coupler lockout position.
Figure 15:
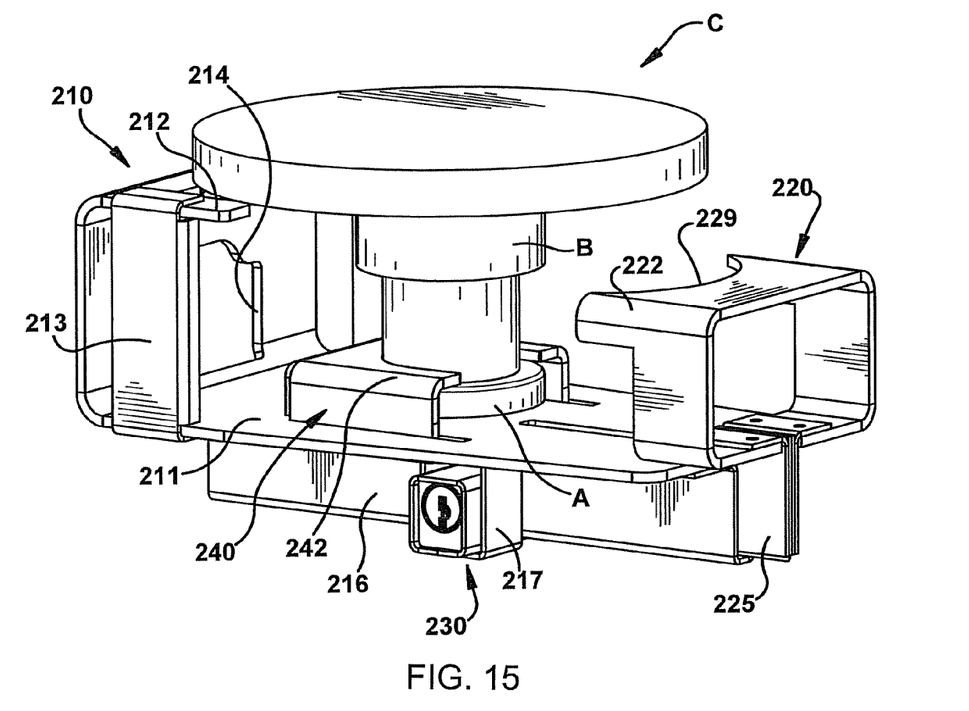
FIG. 15 illustrates a side perspective view of the coupler lockout device of FIG. 12, shown with a flange retention bracket and receiving a flanged coupler.

In the exemplary lockout device 200, an adjustable coupler engagement member or adjustable bracket 220 is slidably coupled with the fixed bracket 210, such that the fixed bracket 210 and adjustable bracket 220 are laterally movable with respect to each other. The adjustable bracket 220 includes a laterally extending slide member 225 configured to be received in (and slidable within) a corresponding slot 215 in the fixed bracket 210 and slide channel member 216 secured to the fixed bracket 210, with the adjustable bracket extending vertically or perpendicularly from the slot 215. A laterally extending or flanged retaining portion 222 is axially spaced from the slide member 225 to receive a laterally extending, enlarged, or flanged portion of a coupler therebetween. One or more axially extending cutouts or openings 224 may be provided to accommodate various flanges, tabs, fasteners or other such projections that may extend laterally from the end portion of the secured coupler. Further, one or more laterally extending cutouts 229 may be provided to accommodate any portion of the coupler extending axially outward from the lockout device 200, while permitting the retaining portion 222 to axially align with (and block) the enlarged end portion of the coupler.

Many different locking arrangements may be provided to secure the lockout device in a lockout position over a coupler. Exemplary arrangements include aligned holes in a fixed bracket (or affixed slide channel) and adjustable bracket (or affixed slide member) adapted to receive a shackle, cable, or other such lock component to prevent lateral movement of the adjustable bracket with respect to the fixed bracket. In one embodiment, a locking mechanism (e.g., key operated lock, combination lock, etc.) is disposed on one of the fixed bracket and the adjustable bracket to selectively lock the adjustable bracket in one of a plurality of incremental lateral positions with respect to the fixed bracket. In the exemplary embodiment, consistent with the locking mechanism of the embodiments of FIGS. 3-11, a locking mechanism 230 is disposed on (e.g., affixed by U-bracket 217) the fixed bracket 210 for adjustable or incremental locking engagement with the slide member 225. The slide member 225 includes a rack portion 227 having a plurality of teeth 228 for interlocking engagement with corresponding teeth 238 on a locking member 237 of the locking mechanism 230 (see FIG. 12). While any type of locking mechanism may be utilized, in the illustrated embodiment, the locking mechanism 230 includes a locking key cylinder 235 (as known in the art), by which rotation of the key cylinder 235 using an authorized key moves the locking member 237 into or out of engagement with a laterally aligned portion of the rack portion 227 of the slide member 225. As described in greater detail above, the locking mechanism may be configured to provide three different conditions: (1) a locked condition, in which the locking member 237 rigidly engages the rack portion 227 to prevent lateral movement in both expanding and constricting directions; (2) an unlocked condition, in which the locking member 237 is disengaged from the rack portion 227 to permit lateral movement in both expanding and constricting directions; and (3) an adjustment condition, in which the locking member 237 is spring biased against the rack portion 227 to permit lateral movement in a constricting direction while preventing lateral movement in an expanding direction. Alternatively, the locking mechanism may be configured to provide only locked and unlocked conditions, or only adjustment and unlocked conditions.

To use the lockout device 200 to restrict access to a coupler, the coupler engagement member 220 is laterally moved away from retaining portion 212 (FIG. 13), such that the coupler (not shown) may be placed between the retaining portions 212, 222, with an end face of the coupler being at least partially covered by the base portion 211. The coupler engagement member is then laterally moved towards retaining portion 212 (FIG. 14) until the retaining portions 212, 222 engage corresponding laterally opposed exterior surfaces of the coupler. The securing mechanism or locking mechanism 230 is placed (by use of an authorized key) in one of an adjustment condition and a locked condition, to prevent lateral movement of the coupler engagement member away from retaining portion 212. In embodiments where an adjustment condition is provided for, the locking mechanism may be placed in the adjustment condition prior to engagement of the laterally opposed exterior surfaces of the coupler by the retaining portions 212, 222.

In some applications, a coupler may be shaped or sized such that the laterally extending, enlarged, or flanged end portion of the coupler is of the same size or smaller than a second laterally extending, enlarged, or flanged portion of the coupler that is axially spaced from, but proximate to, the end portion to be secured. An example of such a coupler is a king pin coupler C, illustrated in FIG. 15. In such an application, the flanged retaining portions 212, 222 of the fixed and adjustable brackets 210, 220 may be incapable of retaining the coupler end portion A, as the second enlarged portion B may prevent constriction of the fixed and adjustable brackets 210, 220 to a lockout position in which the retaining portions 212, 222 axially block the coupler end portion A to prevent axial withdrawal of the coupler C.

To provide for axial retention of such a coupler, in one embodiment, one or both of the fixed bracket and adjustable bracket retaining portions 212, 222 may be configured to be axially adjustable, for example, by providing retaining members movably coupled with the fixed and adjustable brackets 210, 220 for selectively adjustable axial movement of the retaining members (not shown). While many different configurations or arrangements may be utilized for providing an axially adjustable retaining member, one such embodiment is illustrated in FIGS. 8-11 and described in greater detail above.

In another embodiment, according to an inventive aspect of the present application, a separate retaining member or retaining bracket is configured to be removably secured to a fixed bracket or body member (for example, to a base portion of a fixed bracket) to provide an adapted or adaptable retaining portion (e.g., an axially reduced or "low profile" retaining portion, or a laterally inward retaining portion). When the retaining member is secured to the fixed bracket and the coupler is axially received in the lockout device, lateral movement of an adjustable bracket to a lockout position prevents axial withdrawal of the coupler from the lockout device, as retaining portions of the adjustable bracket and the retaining member combine to block axial and lateral movement of the coupler with respect to the lockout device. Further, while the separate retaining member may be lockably secured to the fixed bracket using any suitable arrangement, in one embodiment, the retaining member may be configured to be assembled with the fixed bracket such that disassembly or removal of the retaining member from the fixed bracket is prevented while the lockout device is lockingly secured on the coupler.

In the illustrated embodiment, a removable retaining bracket 240 (FIGS. 12 and 15) is provided for assembly with the base portion 211 of the fixed bracket 210. The exemplary retaining bracket 240 is secured to the fixed bracket 210 by one or more laterally extending prongs 248 insertable through corresponding slots 218 in the base portion 211, allowing the retaining bracket 240 to laterally slide into interlocking retention with the fixed member 210 and be loosely assembled (i.e., without fasteners) with the fixed member 210. The retaining bracket 240 includes a laterally extending retaining portion 242 axially spaced from the prongs 248 to at least partially receive a laterally extending, enlarged, or flanged end portion of a coupler therebetween. The exemplary retaining bracket 240 further includes a laterally extending cutout 249 provided to accommodate the portion of the coupler extending axially outward from the lockout device 200, while permitting the retaining portion 242 to axially align with (and block) the enlarged end portion of the coupler. When the retaining bracket 240 is assembled with the fixed bracket 210 and a coupler C is received in the lockout device 200 (see FIG. 15), movement of the adjustable bracket 220 to a lockout position (where a second enlarged portion B of coupler C is received in laterally extending cutout 229 of the adjustable bracket 220) prevents axial withdrawal of the end portion A of the coupler C from the lockout device 200. In such an arrangement, the retaining portion 222 of the adjustable bracket 220 prevents lateral movement of the coupler C out of engagement with the retaining portion 242 of the retaining bracket 240. Further, the captured coupler C blocks lateral movement of the retaining bracket 240, preventing withdrawal of the prongs 248 from the slots 218. While the illustrated embodiment shows a removable retaining bracket 240 sized for use with a king pin coupler C, retaining brackets of varying size, shape, and cutout dimensions may be provided for use with many different types of couplers.

While the lockout device components may be provided in any suitable material, a durable, weather resistant material, such as steel or stainless steel, may be desirable for outdoor applications and for tamper resistance.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. An assembly for restricting access to a coupler, the assembly comprising:
    a body including a laterally extending slot and a coupler engagement portion for engagement with a first surface of a coupler;
    a coupler engagement member moveably coupled to the body and laterally movable within the slot, the coupler engagement member extending perpendicularly from the slot for engagement with a second surface of the coupler opposite the first surface; and
    a securing mechanism for selectively securing the coupler engagement member relative to the body against lateral movement away from the coupler engagement portion;
    wherein when at least a portion of the coupler is received between the coupler engagement portion and the coupler engagement member, and the coupler engagement member is secured in a coupler lockout position, at least one of the coupler engagement portion and the coupler engagement member prevents withdrawal of the coupler from the assembly.

2. The assembly of claim 1, wherein the securing mechanism is configured to engage a portion of the coupler engagement member disposed within the slot.

3. The assembly of claim 1 wherein the body includes a coupler flange retention portion configured to retain a portion of a flange of the coupler between the coupler flange retention portion and the body.

4. The assembly of claim 1 wherein the securing mechanism is configured to allow lateral movement of the coupler engagement member towards the coupler engagement portion when the coupler engagement member is secured against lateral movement away from the coupler engagement portion.

5. The assembly of claim 1, wherein the securing mechanism is configured to lockingly engage any one of a plurality of lockable portions of the coupler engagement member to secure the coupler engagement member against lateral movement away from the coupler engagement portion in a plurality of lateral positions.

6. The assembly of claim 5, wherein the plurality of lockable portions comprises a plurality of teeth disposed on a slidable rack member.

7. The assembly of claim 1 wherein the coupler engagement portion of the body and the coupler engagement member are configured to engage corresponding laterally opposed exterior surfaces of the coupler when the assembly is secured to the coupler.

8. The assembly of claim 1, wherein the coupler engagement portion is disposed on a bracket loosely assembled with the body.

9. An assembly for restricting access to a coupler, the assembly comprising:

a body member having a base portion and a laterally extending first retaining portion axially spaced from the base portion;

a coupler engagement member moveably coupled to the body member and laterally movable with respect to the first retaining portion, the coupler engagement member including a laterally extending second retaining portion axially spaced from the base portion;

a securing mechanism for selectively securing the coupler engagement member against lateral movement away from the first retaining portion; and a retaining bracket assembled with the base portion and including a third retaining portion laterally between the first retaining portion and the second retaining portion and axially spaced from the base portion to receive a coupler flange therebetween, wherein the first retaining portion is sized to accommodate a first coupler and the third retaining portion is sized to accommodate a second coupler dimensionally different from the first coupler;

wherein when a coupler is received between the first and second retaining portions and the coupler engagement member is secured in a coupler lockout position, each of the first and second retaining portions prevents lateral movement of the coupler and at least one of the coupler engagement portion and the coupler engagement member prevents movement of the coupler away from the base portion.

10. The assembly of claim 9, wherein the securing mechanism is configured to engage a portion of the coupler engagement member disposed within the slot.

11. The assembly of claim 9, wherein the retaining bracket is selectively removable from the base portion to accommodate the first coupler.

12. The assembly of claim 9, wherein the first coupler is a gooseneck coupler and the second coupler is a king pin coupler.

13. The assembly of claim 9, wherein the first retaining portion includes an aperture for receiving a laterally extending portion of a coupler therethrough.

14. The assembly of claim 9, wherein the first retaining portion and the second retaining portion are configured to engage corresponding laterally opposed exterior surfaces of the coupler when the assembly is secured to the coupler.

15. A method for restricting access to a coupler, the method comprising:

positioning at least a portion of the coupler between a first retaining portion of a body and a second retaining portion of a coupler engagement member such that a base portion of the body covers at least a portion of an end face of the coupler;

laterally moving the coupler engagement member within a laterally extending slot of the body until the first retaining portion and the second retaining portion engage corresponding laterally opposed surfaces of the coupler; and securing the coupler engagement member against lateral movement away from the first retaining portion, such that the each of the first retaining portion and the second retaining portion prevents lateral movement of the coupler and at least one of the first retaining portion and the second retaining portion prevents movement of the coupler away from the base portion.

16. The method of claim 15, wherein securing the coupler engagement member against lateral movement away from the first retaining portion comprises lockingly engaging a portion of coupler engagement member disposed within the slot.

17. The method of claim 15, positioning at least a portion of the coupler between a first retaining portion of a body and a second retaining portion of a coupler engagement member comprises receiving a flanged end portion of the coupler between a removable retaining bracket and a base portion of the coupler lockout assembly.

18. The method of claim 15, wherein securing the coupler engagement member against lateral movement away from the first retaining portion comprises permitting lateral movement of the coupler engagement member towards the first retaining portion.

19. The method of claim 15, wherein the corresponding laterally opposed surfaces of the coupler are exterior surfaces of the coupler.

* * * * *